(12) United States Patent
Kerejewski et al.

(10) Patent No.: US 9,091,615 B2
(45) Date of Patent: Jul. 28, 2015

(54) METHOD FOR MONITORING THE FUNCTIONAL SOFTWARE OF CONTROL DEVICES IN A CONTROL DEVICE SYSTEM

(75) Inventors: Tino Kerejewski, Regensburg (DE); Markus Kraus, Reifenthal (DE); Kai Wollenschläger, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 1947 days.

(21) Appl. No.: 11/999,652

(22) Filed: Dec. 6, 2007

(65) Prior Publication Data
US 2008/0140280 A1  Jun. 12, 2008

(30) Foreign Application Priority Data
Dec. 7, 2006 (DE) .......................... 10 2006 057 743

(51) Int. Cl.
| | |
|---|---|
| *F02D 41/22* | (2006.01) |
| *G01M 15/04* | (2006.01) |
| *F02D 41/00* | (2006.01) |
| *F02D 41/26* | (2006.01) |
| *F02D 41/30* | (2006.01) |
| *G01M 15/06* | (2006.01) |

(52) U.S. Cl.
CPC ......... *G01M 15/042* (2013.01); *F02D 41/0082* (2013.01); *F02D 41/22* (2013.01); *F02D 41/266* (2013.01)

(58) Field of Classification Search
CPC .................... F02D 41/00–41/40; F02D 45/00; F02D 28/00; G01M 15/00; G01M 15/04
USPC ....................... 701/31, 33, 107; 714/797, 820
IPC ............ F02D 45/00,28/00; G01M 15/00, 15/04
See application file for complete search history.

(56) References Cited

U.S. PATENT DOCUMENTS

| | | | | |
|---|---|---|---|---|
| 4,679,151 | A * | 7/1987 | Morris et al. ................. | 700/282 |
| 5,001,641 | A * | 3/1991 | Makino .......................... | 701/76 |
| 5,692,472 | A * | 12/1997 | Bederna et al. ............... | 123/350 |
| 5,739,761 | A * | 4/1998 | Kobayashi ..................... | 701/35 |
| 5,987,365 | A * | 11/1999 | Okamoto ....................... | 701/29 |
| 6,032,648 | A * | 3/2000 | Mayer et al. ............. | 123/406.14 |
| 6,064,934 | A * | 5/2000 | Zhang ............................ | 701/51 |
| 6,076,500 | A * | 6/2000 | Clement et al. ............... | 123/362 |
| 6,098,592 | A * | 8/2000 | Hess et al. ..................... | 123/350 |
| 6,223,721 | B1 * | 5/2001 | Bauer et al. ................... | 123/399 |
| 6,285,946 | B1 * | 9/2001 | Steinmann .................... | 701/110 |
| 6,393,356 | B1 * | 5/2002 | Clement et al. ............... | 701/102 |

(Continued)

FOREIGN PATENT DOCUMENTS

| | | |
|---|---|---|
| DE | 42 31 449 A1 | 3/1994 |
| DE | 43 14 118 A1 | 11/1994 |

(Continued)

*Primary Examiner* — Khoi Tran
*Assistant Examiner* — Dale Moyer
(74) *Attorney, Agent, or Firm* — Slayden Grubert Beard PLLC

(57) ABSTRACT

The invention relates to a monitoring method for a control device system with several electronic control devices for driving an internal combustion engine in a motor vehicle, whereby operating variables of the individual control devices are compared with each other, in order to detect a malfunction of the control devices. It is proposed that the control devices are monitored across-the-system, by comparing the operating variables of different control devices of the control device system with one other.

10 Claims, 4 Drawing Sheets

(56) References Cited

U.S. PATENT DOCUMENTS

| | | | |
|---|---|---|---|
| 2004/0015836 A1* | 1/2004 | Layes | 717/106 |
| 2005/0283291 A1* | 12/2005 | Whang | 701/43 |
| 2006/0100772 A1* | 5/2006 | Rauner et al. | 701/114 |
| 2006/0235594 A1* | 10/2006 | Knoefler et al. | 701/48 |
| 2008/0278869 A1* | 11/2008 | Rehm et al. | 361/23 |
| 2009/0132108 A1* | 5/2009 | Seel et al. | 701/22 |
| 2009/0160379 A1* | 6/2009 | Doerr et al. | 318/400.15 |
| 2009/0305842 A1* | 12/2009 | Seel et al. | 477/3 |
| 2009/0319149 A1* | 12/2009 | Rehm et al. | 701/99 |
| 2010/0042276 A1* | 2/2010 | Seel et al. | 701/22 |
| 2010/0186522 A1* | 7/2010 | Niemann et al. | 73/862.193 |
| 2011/0010029 A1* | 1/2011 | Seel et al. | 701/22 |

FOREIGN PATENT DOCUMENTS

| | | |
|---|---|---|
| DE | 196 01 593 A1 | 7/1997 |
| DE | 196 40 432 A1 | 4/1998 |
| DE | 101 13 917 A1 | 9/2002 |

* cited by examiner

METHOD FOR MONITORING THE FUNCTIONAL SOFTWARE OF CONTROL DEVICES IN A CONTROL DEVICE SYSTEM

CROSS REFERENCE TO RELATED APPLICATIONS

This application claims the benefits of German application No. 10 2006 057 743.4 filed Dec. 7, 2006, and is incorporated by reference herein in its entirety.

FIELD OF INVENTION

The invention relates to a monitoring method for a control device system with several electrical control devices for driving an internal combustion engine in a motor vehicle.

BACKGROUND OF THE INVENTION

Modern internal combustion engines of motor vehicles are controlled by an electronic motor controller (ECU: Electronic Control Unit), which contains an increasingly complex functional software. In the operation of the internal combustion engine, the functional software of the electronic control unit is normally monitored according to a 3-level concept. In this concept, errors in the execution of monitoring-relevant scopes of the functional software are detected in a so-called "level 1", whereby calculated torques are monitored. This is done by simulating the torques in the so-called "level 2" and comparing them with each other.

In addition, internal combustion engines are known that are controlled not by a single electronic control device but by several electronic control devices, whereby the individual control devices, for example in a twelve-cylinder engine with two cylinder banks, is responsible for one of the two cylinder banks in each instance. In the case of such a control device system with several electronic control devices the functional monitoring of the individual control devices is customarily carried out separately for the individual control devices, which is, however, relatively complex.

SUMMARY OF INVENTION

The object of the invention is thus to suitably improve the afore-described known method for monitoring a control device system having several electronic control devices for driving an internal combustion engine in a motor vehicle.

This object is achieved in accordance with the invention by a monitoring method as claimed in the claims.

The invention includes the general technical teaching which involves not monitoring the individual control devices of a control device system separately and independently of each other, but instead monitoring the control devices on an across-the-system basis, by comparing the operating variables of different control devices of the control device system with one other, whereby a malfunction in the control device system can be detected with minimal effort.

The operating variables of the individual control devices that are compared with each other during the monitoring method according to the invention, are preferably torque values of the internal combustion engine, wherein, for example, a nominal torque of the internal combustion engine is compared with the actual torque of the internal combustion engine, as is also the case with the conventional monitoring method mentioned in the introduction. Therefore the functional software in the individual control devices is preferably checked by comparing the simulated torques, i.e. of nominal torque and actual torque. An error is detected when the deviation of the simulated actual torques deviates to an unacceptable extent from the simulated nominal torque and error responses are initiated.

In a preferred exemplary embodiment of the invention, nominal torques of the internal combustion engine and actual torques of the internal combustion engine are determined for the individual control devices in each instance.

The maximum deviation between the nominal torques determined on the one hand and the actual torques determined is then determined. To this end, the maximum value of the individual actual torques and the minimum value of the individual nominal torques is preferably determined first. Subsequently a comparison is made between the maximum value of the actual torque and the minimum value of the nominal torques, in order to detect a malfunction in the control device system. By way of example, an error signal can then be generated, if the deviation between the maximum value of the individual actual torque on the one hand, and the minimum value of the individual nominal torque on the other hand, exceeds a preset limit value.

The comparison between the maximum value and the minimum value is preferably made not only in one single control device, but in several control devices, so as to create a redundancy in the comparison. In order to maximize the redundancy, the comparison between the maximum value and the minimum value can even be undertaken in each of the control devices.

In a possible exemplary embodiment of the invention the actual torques in the individual control devices are calculated in each instance from at least one base factor of the respective control device, whereby, for example, the respective air-mass flow, the ignition angle, the injection timing, the injection period and/or a load signal can be taken into consideration. Further possible base factors for determining the actual torques are the inlet manifold pressure, the injection pressure and/or the air ratio, which can be measured for example using a conventional lambda probe. Hereby, every change in the functional software and in the hardware, as well as in the system configuration, which could influence the calculation of the torques or the base factors thereof, are allowed for when ensuring the functional reliability of the base factors and calculating the simulated torques.

The monitoring of control devices having identical functional software in a control device system advantageously allows the monitoring of the functional software to be simplified considerably.

In the preferred exemplary embodiments of the invention, the internal combustion engine has several cylinder banks, with the individual control devices being responsible in each instance for one of the cylinder banks. The invention nevertheless also allows the responsibility of the individual control devices to be allocated differently. For example, the individual control devices can be responsible for driving different units of the internal combustion engine.

In addition the invention also comprises a computer program product, which executes the monitoring method as claimed in one of the preceding claims, when it is loaded into a program memory of one of the control devices and runs on the control device.

Finally the invention also comprises a control device with a program memory, into which a computer program is loaded, which program executes the monitoring method according to the invention.

BRIEF DESCRIPTION OF THE DRAWINGS

Other advantageous developments of the invention are identified in the subclaims or are explained below in greater detail together with the description of the preferred exemplary embodiments of the invention using the figures, in which;

DETAILED DESCRIPTION OF INVENTION

Figure 1:
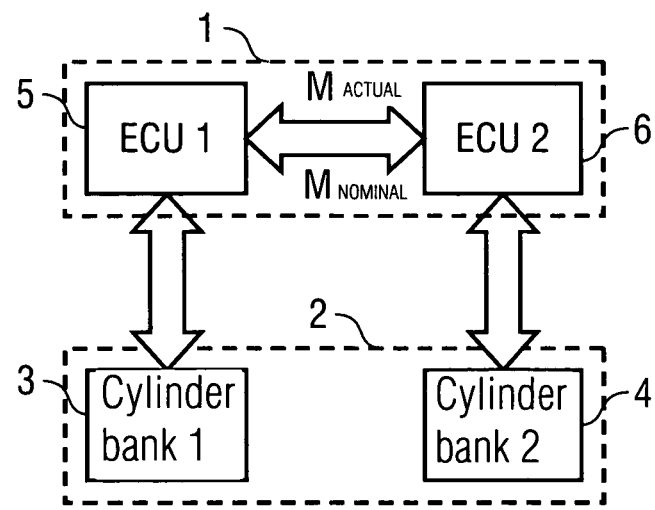
FIG. 1 shows a simplified block diagram of a control device system according to the invention with two control devices for controlling two cylinder banks of an internal combustion engine.

The block diagram in FIG. 1 shows, in a very simplified form, a control device system 1 for controlling an internal combustion engine 2 in a motor vehicle.

In this exemplary embodiment, the internal combustion engine 2 is a 12-cylinder spark ignition engine with 2 cylinder banks 3, 4, wherein a control device 5 or 6 (ECU: Electronic Control Unit) is allocated in each instance to the two cylinder banks 3, 4 in the control device system 1.

Figure 2:
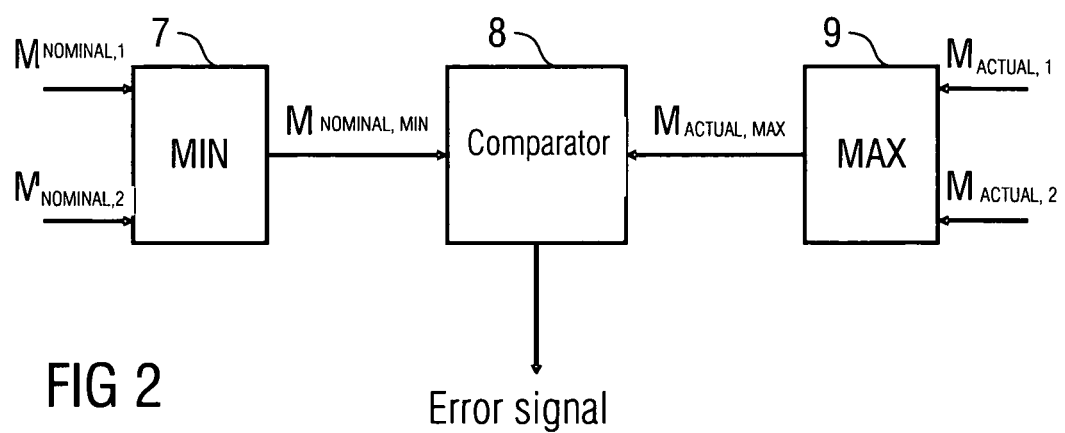
FIG. 2 shows a block diagram representation of the mode of operation of the monitoring method in the control device system according to FIG. 1.

The control device system 1 herewith allows across-the-system monitoring of the functional software of the two control devices 5, 6, as is described below using the block diagram according to FIG. 2.

Thus the software in the two control devices 5, 6 has a computing module 7, which on the input side records simulated nominal values $M_{NOMINAL,1}$, $M_{NOMINAL,2}$ for the torque of the internal combustion engine 2, whereby the nominal value $M_{NOMINAL,1}$ is simulated by the control device 5, while the nominal value $M_{SOLL,2}$ is simulated by the other control device 6. The computing module 7 then calculates a minimum value $M_{NOMINAL,MIN}$ of the nominal values that may have been simulated from these nominal values recorded on the input side and forwards the minimum value $M_{NOMINAL,MIN}$ to a comparator module 8.

In addition, the software of the two control devices 5, 6 has an additional computing module 9, which on the input side records actual values $M_{ACTUAL,1}$, $M_{ACTUAL,2}$ of the torque of the internal combustion engine 2, whereby the actual value $M_{ACTUAL,1}$ is simulated by the control device 5, while the other actual value $M_{ACTUAL,2}$ is simulated by the other control device 6. The computing module 9 calculates a maximum value $M_{ACTUAL,MAX}$ of the actual values recorded on the input side from these actual values $M_{ACTUAL,1}$, $M_{ACTUAL,2}$ recorded on the input side and sends this maximum value $M_{ACTUAL,MAX}$ to the comparator module 8.

The comparator module then determines the deviation between the minimum value $M_{NOMINAL,MIN}$ and the maximum value $M_{ACTUAL,MAX}$ and generates an error signal if a preset maximum deviation is exceeded, said error signal indicating a malfunction in the control device system 1.

Figure 3:
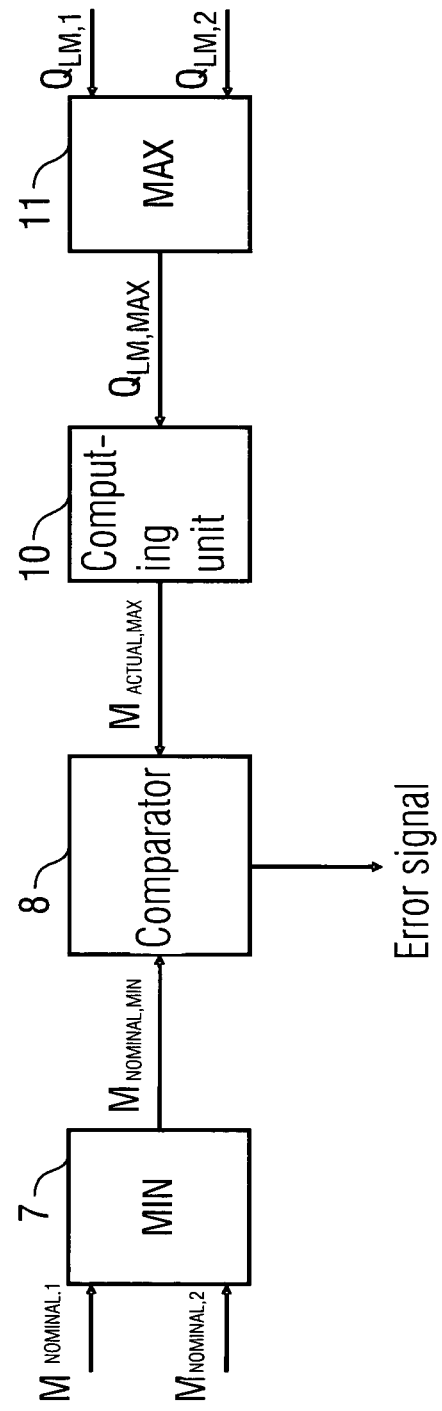
FIG. 3 shows a modification of the block diagram in FIG. 2.

FIG. 3 shows a modification of the block diagram according to FIG. 2, wherein the modification largely matches the above exemplary embodiment according to FIG. 2, so that reference is made to the above description in order to avoid repetitions, whereby for corresponding details the same reference characters are used in the following.

A special feature of this exemplary embodiment is that the maximum value $M_{ACTUAL,MAX}$ of the torque is calculated by a computing module 10 from a maximum value $Q_{LM,MAX}$ of two air-mass flows $Q_{LM,1}$, $Q_{LM,2}$, wherein a further computing module 11 determines the maximum value $Q_{LM,MAX}$.

Figure 4:
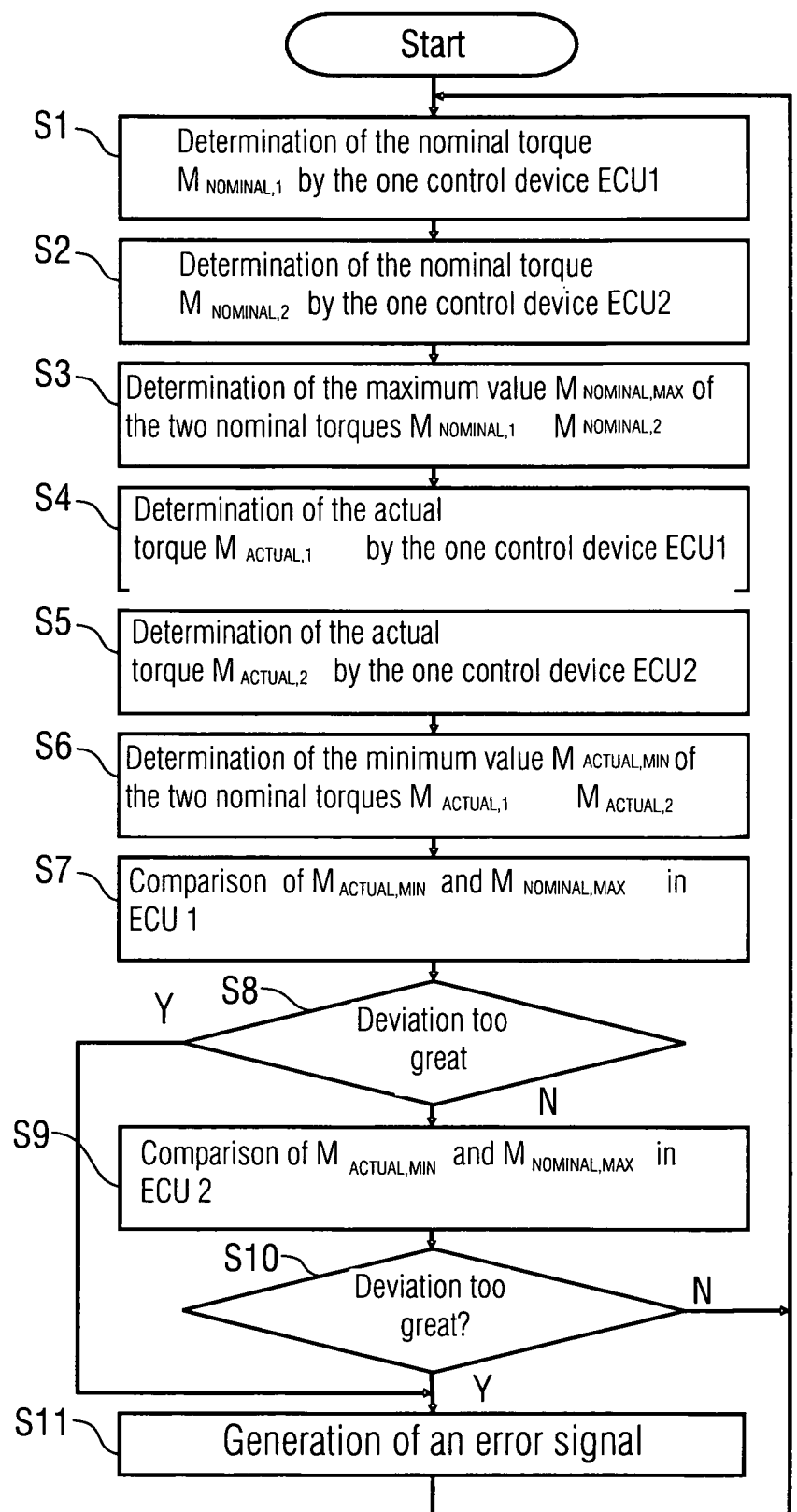
FIG. 4 shows the monitoring method according to the invention in the form of a flow chart.

In the following, the operational sequence of the monitoring method according to the invention is described using the flow chart according to FIG. 4.

In a first step S1, a nominal torque $M_{NOMINAL,1}$ is first determined in the control device ("ECU1").

In a second step S2, the nominal torque $M_{NOMINAL,2}$ is then determined in the other control device 6 ("ECU2").

From these two nominal torques $M_{NOMINAL,1}$, $M_{NOMINAL,2}$ the maximum value $M_{NOMINAL,MAX}$ is then determined in a further step S3.

Subsequently, in step S4 the actual torque $M_{ACTUAL,1}$ is determined by the control device 5 ("ECU1").

In step S5 the actual torque $M_{ACTUAL,2}$ is determined by the other control device 6 ("ECU2").

Then from the two actual torques $M_{ACTUAL,1}$, $M_{ACTUAL,2}$ the minimum value $M_{ACTUAL,MIN}$ is determined in step S6.

In a further step S7 a comparison is made between the minimum value $M_{ACTUAL,MIN}$ and maximum value $M_{NOMINAL,MAX}$ in the control device 5 ("ECU1").

If the deviation between these values exceeds a preset limit value, then in step S8 the sequence jumps to a further step S11, in which an error signal is generated, which indicates a malfunction of the control device system.

If, on the other hand, the comparison in the control device 5 ("ECU1") does not show any error, then a further comparison is subsequently made in step S9, but this time in the other control device 6 ("ECU2"). The repetition of the comparison in the other control device 6 advantageously offers a redundancy.

If this second comparison indicates that a limit value has been exceeded, then in step S10 the sequence moves to step S11, in which the error signal is generated. Otherwise the monitoring method with steps S1 to S11 is continuously repeated during the operation of the internal combustion engine.

Figure 5:
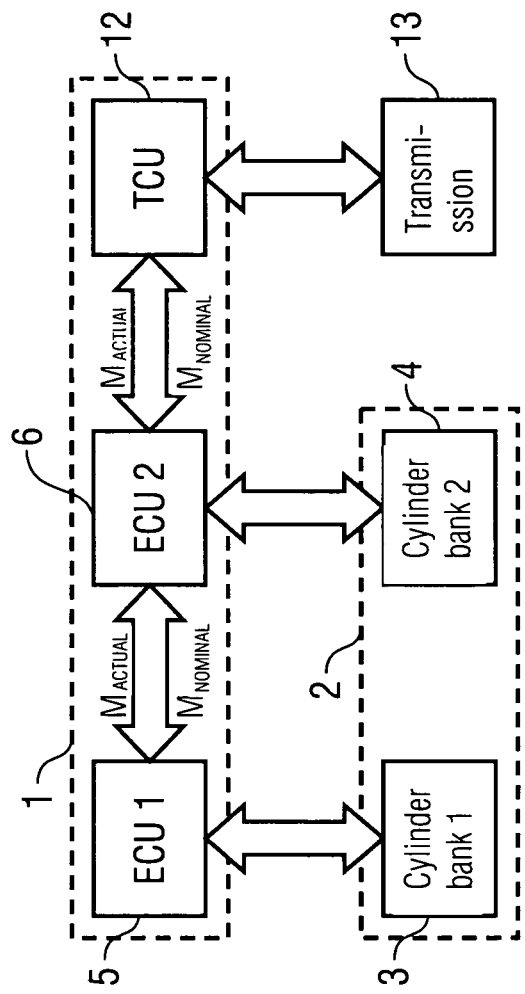
FIG. 5 shows a further exemplary embodiment of a control device system according to the invention with three control devices.

Finally, FIG. 5 shows a further exemplary embodiment of a control device system 1, wherein this exemplary embodiment largely matches the exemplary embodiment according to FIG. 1, so that reference is made to the afore-mentioned description in order to avoid repetitions.

A special feature of the control device system 1 consists in this exemplary embodiment in that in addition to the two control devices 5, 6 for the two cylinder banks 2, 3, a third control device 12 (TCU: Transmission Control Unit) forms part of the control device system 1, wherein the control device 12 controls an automatic transmission 13.

The three control devices 5, 6 and 12 of the control device system 1 exchange actual torques $M_{ACTUAL}$ and nominal torques $M_{NOMINAL}$ between each other, wherein the monitoring method according to the invention compares these torque values with each other. If one of the control devices 5, 6, 12 provides deviating torque values, while the two other control devices provide matching torques, it can be assumed that the control device in question is defective. In comparison with the exemplary embodiment according to FIG. 1, the additional control device 12 thus makes it possible not only to determine whether one of the control devices 5, 6, 12 is defective, but also allows the defective control devices to be identified.

The invention claimed is:

1. A monitoring method for a control device system having a plurality of electronic control devices for controlling an internal combustion engine in a motor vehicle, comprising:
    for each of a plurality of individual electronic control devices of the control device system, calculating both (a)

an actual value of an operating variable of the internal combustion engine and (b) a nominal value of the operating variable of the internal combustion engine, such that a plurality of actual values of the operating variable and a plurality of nominal values of the operating variable are calculated, comparing, by the electronic control devices, the plurality of actual values of the operating variable to each other to determine a maximum actual value of the operating variable corresponding to any one of the individual electronic control devices, comparing, by the electronic control devices, the plurality of nominal values of the operating variable to each other to determine a minimum nominal value of the operating variable corresponding to any one of the individual electronic control devices, after determining the maximum actual value of the operating variable corresponding to any one of the individual electronic control devices and the minimum nominal value of the operating variable corresponding to any one of the individual electronic control devices, comparing the maximum actual value of the operating variable with the minimum nominal value of the operating variable; and detecting a malfunction in the control device system based on the results of the comparison of the maximum actual value of the operating variable with the minimum nominal value of the operating variable.

2. The monitoring method as claimed in claim 1, wherein the operating variable is a torque of the internal combustion engine.

3. The monitoring method as claimed in claim 2, comprising:

determining nominal torque values of the internal combustion engine by each of the individual ones of the electronic control devices, determining actual torque values of the internal combustion engine by each of the individual ones of the electronic control devices, determining a maximum value of the individual actual torques or nominal torques, determining a minimum value of the individual nominal torques or actual torques, and comparing the maximum value with the minimum value in order to detect a malfunction in the control device system.

4. The monitoring method as claimed in claim 3, wherein the actual values of torque are calculated from one base factor of the respective electronic control device.

5. The monitoring method as claimed in claim 4, wherein the actual values of torque is calculated based on the at least one of the variables selected from the group consisting of: air-mass flow, ignition angle, injection timing, injection period, load signal, inlet manifold pressure, injection pressure, and air ratio.

6. The monitoring method as claimed in claim 5, wherein the comparison of the minimum nominal value of the operating variable with the maximum actual value of the operating variable is carried out by each of the control devices in order to create redundancy.

7. The monitoring method as claimed claim 6, wherein the internal combustion engine has a plurality of cylinder banks, where the individual ones of the electronic control devices are respectively responsible for one of the cylinder banks.

8. The monitoring method as claimed in claim 7, wherein the control device system contains at least three control devices, and a comparison of the operating values of the individual control devices determines which of the control devices is not working properly.

9. A non-transitory computer program product that executes control method for a control device system having a plurality of electronic control devices for controlling an internal combustion engine in a motor vehicle, comprising:

for each of a plurality of individual electronic control devices of the control device system, calculating both (a) an actual torque value for the internal combustion engine and (b) a nominal torque value for the internal combustion engine, such that a plurality of actual torque values and a plurality of nominal torque values are calculated, comparing, by the electronic control devices, the plurality of actual torque values to each other to determine a maximum actual torque value corresponding to any one of the individual electronic control devices, comparing, by the electronic control devices, the plurality of nominal torque values to each other to determine a minimum nominal torque value corresponding to any one of the individual electronic control devices, after determining the maximum actual torque value corresponding to any one of the individual electronic control devices and the minimum nominal torque value corresponding to any one of the individual electronic control devices, comparing the maximum actual torque value with the minimum nominal torque value; and detecting a malfunction in the control device system based on the results of the comparison of the maximum actual torque value with the minimum nominal torque value.

10. A control device with a non-transitory program memory, into which a computer program is loaded, which program executes the monitoring method in conjunction with co-existing control devices connected via a system, comprising:

a calculation unit programmed to calculate both (a) an actual value of an operating variable of an engine and (b) a nominal value of the operating variable of an engine;

an operating variable comparator that:

receives actual values and nominal values of the operating variable calculated by at least other control device;

compares the actual value of the operating variable calculated by the calculation unit and the actual values of the operating variable received from the at least other control device to determine a maximum actual value of the operating variable corresponding to any one of the control devices;

compares the nominal value of the operating variable calculated by the calculation unit and the nominal values of the operating variable received from the at least other control device to determine a minimum nominal value of the operating variable corresponding to any one of the control devices;

after determining the maximum actual value of the operating variable corresponding to any one of the control devices and the minimum nominal value of the operating variable corresponding to any one of the control devices, compares the maximum actual value of the operating variable with the minimum nominal value of the operating variable to detect a malfunction in the control device system.

* * * * *